(12) United States Patent
Kim et al.

(10) Patent No.: US 11,770,768 B2
(45) Date of Patent: *Sep. 26, 2023

(54) METHOD AND APPARATUS FOR DISCONTINUOUS TRANSMISSION/RECEPTION OPERATION FOR REDUCING POWER CONSUMPTION IN CELLULAR SYSTEM

(71) Applicant: Electronics and Telecommunications Research Institute, Daejeon (KR)

(72) Inventors: Jae-Heung Kim, Daejeon (KR); Byung-Han Ryu, Daejeon (KR); Seung-Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,038

(22) Filed: Jan. 17, 2022

(65) Prior Publication Data
US 2022/0150828 A1    May 12, 2022

Related U.S. Application Data

(63) Continuation of application No. 16/428,968, filed on Jun. 1, 2019, now Pat. No. 11,240,754, which is a
(Continued)

(30) Foreign Application Priority Data

Dec. 22, 2005    (KR) .......................... 10-2005-0127704

(51) Int. Cl.
*H04W 52/02* (2009.01)
*H04W 76/28* (2018.01)

(52) U.S. Cl.
CPC ....... *H04W 52/0216* (2013.01); *H04W 76/28* (2018.02); *Y02D 30/70* (2020.08)

(58) Field of Classification Search
None
See application file for complete search history.

(56) References Cited

U.S. PATENT DOCUMENTS 5,590,396 A    12/1996  Henry
6,067,301 A     5/2000  Aatresh
(Continued)

FOREIGN PATENT DOCUMENTS

EP    1521493 A2    4/2005
GB    2406751 A     4/2005
(Continued)

OTHER PUBLICATIONS

Shun-Ren Yangand Yi-Bing Lin, Modeling UMTS Discontinuous Reception Mechanism, Jan. 2005, IEEE, vol. 4, No. 1, pp. 312-319 (Year: 2005).*

(Continued)

*Primary Examiner* — Kouroush Mohebbi
(74) *Attorney, Agent, or Firm* — INSIGHT LAW GROUP, PLLC; Seung Lee (57) ABSTRACT

Provided is a method and apparatus for discontinuously transmitting/receiving packets for low-power consumption of a terminal in a cellular system for packet transmission. The present research provides a method and apparatus that can perform a low-power consuming operation when a terminal is in active state in a cellular system. The method for discontinuously transmitting/receiving packet data to reduce power consumption of a terminal in a cellular system, including the steps of: a) establishing discontinuous reception/transmission (DRX/DTX) parameters including discontinuous DRX/DTX cycle information for terminals operat-
(Continued)

ing in a transmission suspension mode, which is a sub-state of an active state; and b) performing DRX/DTX based on the DRX/DTX parameters in the terminals operating in the transmission suspension mode.

18 Claims, 6 Drawing Sheets

Related U.S. Application Data continuation of application No. 15/813,009, filed on Nov. 14, 2017, now Pat. No. 10,341,950, which is a continuation of application No. 14/923,981, filed on Oct. 27, 2015, now Pat. No. 9,838,965, which is a continuation of application No. 13/612,436, filed on Sep. 12, 2012, now Pat. No. 9,198,128, which is a continuation of application No. 12/158,628, filed as application No. PCT/KR2006/005664 on Dec. 22, 2006, now Pat. No. 8,305,945.

(56) References Cited

U.S. PATENT DOCUMENTS

| | | | |
|---|---|---|---|
| 6,104,929 A | 8/2000 | Josse et al. | |
| 6,370,392 B1 | 4/2002 | Li et al. | |
| 6,377,803 B1 | 4/2002 | Ruohonen | |
| 6,480,476 B1 | 11/2002 | Willars | |
| 6,999,799 B1 | 2/2006 | Almassy | |
| 7,050,439 B1 | 5/2006 | Kaaresoja | |
| 7,197,341 B2 | 3/2007 | Bultan et al. | |
| 7,352,761 B2 | 4/2008 | Lodha et al. | |
| 7,610,035 B2 | 10/2009 | Van Bosch et al. | |
| 8,027,373 B2 | 9/2011 | Subrahmanya et al. | |
| 8,098,635 B2 | 1/2012 | Montojo et al. | |
| 8,305,945 B2 | 11/2012 | Kim et al. | |
| 9,198,128 B2 | 11/2015 | Kim et al. | |
| 9,838,965 B2 * | 12/2017 | Kim ...................... | H04W 76/28 |
| 10,341,950 B2 * | 7/2019 | Kim .................. | H04W 52/0216 |
| 11,240,754 B2 * | 2/2022 | Kim ...................... | H04W 76/28 |
| 2002/0024973 A1 | 2/2002 | Tavana et al. | |
| 2003/0117968 A1 | 6/2003 | Motegi et al. | |
| 2003/0223445 A1 | 12/2003 | Lodha | |
| 2004/0023672 A1 | 2/2004 | Terry | |
| 2004/0116110 A1 | 6/2004 | Amerga et al. | |
| 2004/0127206 A1 | 7/2004 | Van Bosch et al. | |
| 2004/0127265 A1 | 7/2004 | Van Bosch et al. | |
| 2005/0148348 A1 | 7/2005 | Cramby et al. | |
| 2005/0176474 A1 | 8/2005 | Lee et al. | |
| 2006/0126554 A1 | 6/2006 | Motegi et al. | |
| 2006/0159061 A1 | 7/2006 | Takano et al. | |
| 2006/0195576 A1 * | 8/2006 | Rinne ..................... | H04L 47/70 |
| | | | 709/226 |
| 2006/0262739 A1 | 11/2006 | Ramirez et al. | |
| 2007/0064662 A1 | 3/2007 | Sultan et al. | |
| 2008/0220796 A1 | 9/2008 | Kohlmann et al. | |
| 2008/0293426 A1 | 11/2008 | Kim et al. | |
| 2008/0309490 A1 | 12/2008 | Honkanen et al. | |
| 2013/0003633 A1 | 1/2013 | Kim et al. | |
| 2016/0050625 A1 | 2/2016 | Kim et al. | |
| 2018/0139697 A1 | 5/2018 | Kim et al. | |
| 2019/0289545 A1 | 9/2019 | Kim et al. | |

FOREIGN PATENT DOCUMENTS

| | | |
|---|---|---|
| WO | 00/54424 A2 | 9/2000 |
| WO | 01/03381 A1 | 1/2001 |
| WO | 01/95648 A1 | 12/2001 |
| WO | 2005/067175 A1 | 7/2005 |

OTHER PUBLICATIONS

European Search Report dated Jun. 2, 2010 in corresponding European Patent Application No. 06835368.9.
European Search Report dated Jun. 4, 2010 in corresponding European Patent Application No. 10158319.3.
Notice of Allowance dated Aug. 15, 2012 in related U.S. Appl. No. 12/158,628.
Office Action dated May 31, 2012 in related U.S. Appl. No. 12/158,628.
Office Action dated Apr. 8, 2011 in related U.S. Appl. No. 12/158,628.
Final Office Action dated Nov. 2, 2011 in related U.S. Appl. No. 12/158,628.
Notice of Allowance dated Sep. 10, 2013 in related U.S. Appl. No. 12/750,127.
Office Action dated Feb. 25, 2013 in related U.S. Appl. No. 12/750,127.
Office Action dated Apr. 11, 2011 in related U.S. Appl. No. 12/750,127.
Final Office Action dated Apr. 12, 2012 in related U.S. Appl. No. 12/750,127.
Final Office Action dated Jan. 19, 2012 in related U.S. Appl. No. 12/750,127.
Advisory Action dated Jun. 19, 2012 in related U.S. Appl. No. 12/750,127.
Supplemental Notice of Allowability dated Oct. 29, 2013 in related U.S. Appl. No. 13/224,962.
Office Action dated Apr. 18, 2013 in related U.S. Appl. No. 13/224,962.
Notice of Allowance dated Jul. 20, 2015 in related U.S. Appl. No. 13/612,436.
Office Action dated Sep. 25, 2014 in related U.S. Appl. No. 13/612,436.
Office Action dated Jan. 15, 2014 in related U.S. Appl. No. 13/612,436.
Final Office Action dated Feb. 4, 2015 in related U.S. Appl. No. 13/612,436.
Final Office Action dated May 9, 2014 in related U.S. Appl. No. 13/612,436.
Advisory Action dated Sep. 2, 2014 in related U.S. Appl. No. 13/612,436.
Office Action dated Jun. 24, 2016 in related U.S. Appl. No. 14/923,981.
Office Action dated Feb. 9, 2017 in related U.S. Appl. No. 14/923,981.
Notice of Allowance dated Aug. 1, 2017 in related U.S. Appl. No. 14/923,981.
Non-final Office Action dated Apr. 3, 2018 in related U.S. Appl. No. 15/813,009.
Notice of Allowance dated Feb. 20, 2019 in related U.S. Appl. No. 15/813,009.
Non-final Office Action dated May 22, 2020 in related U.S. Appl. No. 16/428,968.
Final Office Action dated Dec. 31, 2020 in related U.S. Appl. No. 16/428,968.
Notice of Allowance dated Sep. 23, 2021 in related U.S. Appl. No. 16/428,968.

* cited by examiner

METHOD AND APPARATUS FOR DISCONTINUOUS TRANSMISSION/RECEPTION OPERATION FOR REDUCING POWER CONSUMPTION IN CELLULAR SYSTEM

CROSS REFERENCE TO RELATED APPLICATION

The present application is a continuation of U.S. patent application Ser. No. 16/428,968, filed on Jun. 1, 2019 (now pending), which is a continuation of U.S. patent application Ser. No. 15/813,009, filed on Nov. 14, 2017 (now U.S. Pat. No. 10,341,950), which is a continuation of U.S. patent application Ser. No. 14/923,981, filed on Oct. 27, 2015 (now U.S. Pat. No. 9,838,965), which is a continuation of U.S. patent application Ser. No. 13/612,436, filed on Sep. 12, 2012 (now U.S. Pat. No. 9,198,128), which is a continuation of U.S. patent application Ser. No. 12/158,628, filed on Jun. 20, 2008 (now U.S. Pat. No. 8,305,945), which is a national stagy application of International Application No. PCT/KR2006/005664, filed on Dec. 22, 2006, which claims priority to and benefit of Korean Application No. 10-2005-0127704, filed on Dec. 22, 2005, the content of which are incorporated by reference in their entirety.

TECHNICAL FIELD

The present invention relates to a cellular system for packet services; and, more particularly, to a method and apparatus for discontinuously transmitting/receiving packets to reduce power consumption of a terminal in a cellular system for packet transmission.

BACKGROUND ART

Terminals in a Wideband Code Division Multiple Access (WCDMA) Third-Generation Partnership Project (3GPP) system are divided into those of an active state where data can be transmitted and those of an idle state. Only terminals of the idle state perform discontinuous reception (DRX) to reduce their power consumption.

To perform the DRX, a DRX cycle is determined and used for monitoring according to a paging occasion in a paging channel (PCH), and the DRX cycle is determined in a network and the same DRX cycle is applied to all terminals within the coverage of a predetermined base station.

In other words, in the conventional 3GPP system, terminals in an idle mode operate in sleep mode (i.e., low-power consuming operation) to reduce power consumption by using the DRX cycle, which is a system parameter.

Whereas the WCDMA 3GPP system aims to provide circuit and packet services in a circuit-based system, a 3GPP Long-Term Evolution (LTE), which is under standardization process to provide diverse packet services, is a packet-based system aiming to provide only a packet service.

Therefore, the conventional method of applying a DRX cycle only to idle-mode terminals and reducing the power consumption of the terminals is not appropriate to the LTE system which is devised to provide a packet service having a burst characteristic.

In short, it is required to develop a method that can reduce power consumption not only in idle-state terminals whose session for a packet service is terminated, but also in terminals whose session is not terminated yet but in an active state where data can be transmitted in a section where there is no data to be transmitted based on the burst characteristic of packet traffic to provide a packet service having a burst characteristic and diverse qualities of service (QoS).

Also, it is required to realize a method and apparatus that can reduce power consumption of a terminal by optionally determining parameters for discontinuous reception/transmission operation based on the QoS of a packet service provided by a cellular system such as a WCDMA 3GPP system to thereby minimize a processing time when a terminal switches between a transmission mode (Tx on) where the terminal transmits packet data and a transmission suspension mode (Tx off) where it does not transmit packet data; and efficiently operating the transmission suspension mode section where the terminal does not transmit packet data.

DISCLOSURE

Technical Problem

It is, therefore, an object of the present invention devised to resolve the above problems to provide a method and apparatus that can perform a low-power consuming operation when a terminal is in active state in a cellular system.

Also, it is another object of the present invention to provide a discontinuous reception/transmission (DRX/DTX) method and apparatus that can improve a power saving function of a terminal and minimize processing time needed for switching into a low-power consuming operation mode to thereby reduce power consumption of the terminal in a cellular system for transmitting packets by determining DRX/DTX parameters according to the quality of service (QoS) of a packet service provided by the cellular system for transmitting packets.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided a method for discontinuously transmitting/receiving packet data to reduce power consumption of a terminal in a cellular system, comprising the steps of: a) establishing discontinuous reception/transmission (DRX/DTX) parameters including discontinuous DRX/DTX cycle information for terminals operating in a transmission suspension mode, which is a sub-state of an active state; and b) performing DRX/DTX based on the DRX/DTX parameters in the terminals operating in the transmission suspension mode.

Also, the discontinuous reception/transmission method for reducing power consumption of a terminal in a cellular system transmitting packets, which is suggested in the present invention, includes the steps of establishing DRX/DTX parameters including DRX/DTX cycle information; and performing a low power-consuming operation based on the DRX/DTX parameters.

Also, a base station apparatus for discontinuously transmitting/receiving packet data to reduce power consumption of a terminal in a cellular system for transmitting packets, includes a terminal state management unit and a DRX/DTX control unit. The terminal state management unit manages and switches the state of the terminal according to whether the terminal is in an idle state or an active state. The DRX/DTX control unit establishes DRX/DTX parameters including DRX/DTX cycle information for terminals operating in a transmission suspension mode, which is a sub-state of the active state, and controls the DRX/DTX operation based on the DRX/DTX parameters.

Also, the DRX/DTX terminal of the present invention that has a reduced power consumption in a cellular system for transmitting packets includes a terminal state management unit and a low power-consuming operation unit. The terminal state management unit controls mode switching between a transmission suspension mode and a transmission mode, which are sub-states of the active state. The low power-consuming operation unit establishes DRX/DTX parameters including DRX/DTX cycle information and controls a terminal to perform a low power-consuming operation based on the DRX/DTX parameters while it is in the transmission suspension mode.

Advantageous Effects

The present invention increases the capacity of an active-state terminal that can be accommodated by a base station by variably applying parameters for discontinuous reception/transmission (DRX/DTX) according to the type and QoS of a packet service provided by a cellular system for transmitting packets and efficiently utilizing limited radio resources for transmitting control information. The present invention also improves a power-saving function of a terminal and minimizes processing time needed for mode switching of the DRX/DTX by consuming only power needed for a reception module of the terminal according to a DRX/DTX cycle when there are no data to be transmitted.

In addition, the present invention can perform DRX/DTX operation not only in an idle state but in an active state to reduce power consumption of the terminal in a cellular system for transmitting packets.

BEST MODE FOR THE INVENTION

Other objects and aspects of the invention will become apparent from the following description of the embodiments with reference to the accompanying drawings, which is set forth hereinafter. Accordingly, those skilled in the art of the present invention can easily implement the technological concept of the present invention. Also, when it is considered that detailed description on a prior art related to the present invention may obscure the points of the present invention unnecessarily in the description of the present invention, the description will not be provided. Hereinafter, specific embodiments of the present invention will be described in detail with reference to the accompanying drawings.

Figure 1:
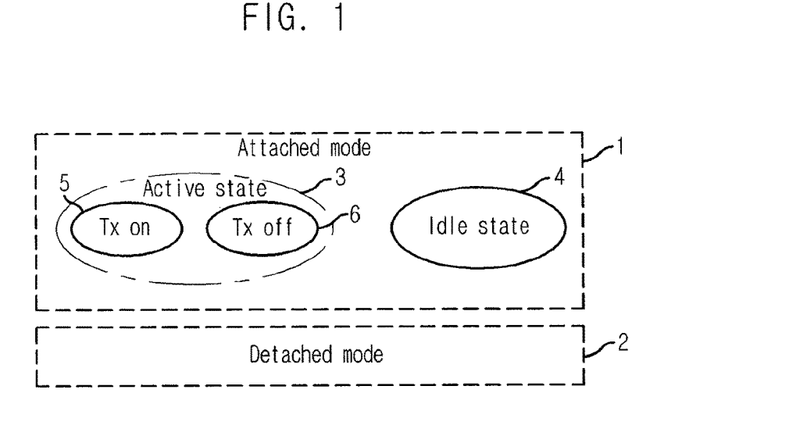
FIG. 1 is a diagram illustrating a cellular system to which the present invention is applied.

FIG. 1 is a diagram illustrating a cellular system to which the present invention is applied.

A cellular system providing a packet service defines and manages the state of a terminal as shown in FIG. 1 to efficiently operate limited radio resources in nodes over a base station, i.e., a node B.

When a terminal is registered on a network through a base station, the state of the terminal is defined as an attached mode 1. When a terminal is not recognized on a cellular network and the base station, or when the terminal is not registered, the state of the terminal is defined as a detached mode 2.

Terminals in the attached mode 1 are divided into those of an active state 3 and those of an idle state 4 according to whether or not a packet service is provided.

The active state 3 is a state where a terminal can be allocated with radio resources for transmitting/receiving packet data under the control of a scheduling unit disposed in a base station.

The active state 3 is divided into a transmission mode (Tx on) 5 and a transmission suspension mode (Tx off) 6 according to whether radio resources for transmitting packet data are allocated.

A conventional terminal performs a low power-consuming operation, which is so-called a power-saving operation, by maintaining only the least control channel with a base station only in the idle state 4 where there is no data to be transmitted/received based on the burst property of packet data. The terminal may enter the idle state 4 by a scheduling unit of a base station, regardless of the state of the terminal.

Figure 2:
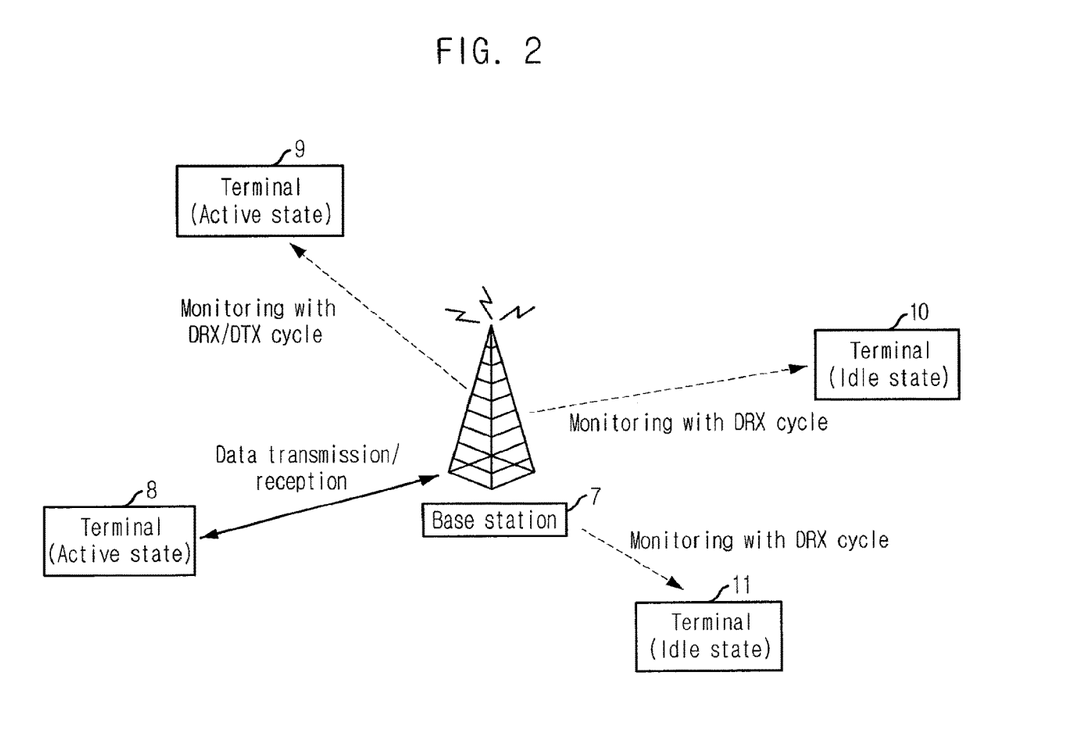
FIG. 2 is a view describing operation of a terminal with a base station based on the state of the terminal in a cellular system in accordance with an embodiment of the present invention.

FIG. 2 is a view describing operation of a terminal with a base station based on the state of the terminal in a cellular system in accordance with an embodiment of the present invention.

As illustrated in FIG. 2, terminals 8, 9, 10 and 11 are disposed in a service coverage of a base station 7 in a cellular system for a packet service and receive a service by transmitting/receiving data to/from the base station 7.

Terminals disposed within a service coverage of a base station perform different operations according to the connection state shown in FIG. 1.

Terminals 10 and 11 in the idle state, which have not set up a data channel for transmitting/receiving data to/from a base station, monitor paging channel information by informing reception of data for call setup transmitted from a base station according to a predetermined DRX cycle to reduce power consumption.

Meanwhile, active-state terminals are divided into those 8 that transmit/receive data to/from a base station and do not perform discontinuous reception/transmission (DRX/DTX) operation to reduce power consumption and those that perform DRX/DTX operation for low power-consumption in the active state.

The terminals 9 that perform the DRX/DTX operation to reduce power-consumption in the active state monitor a message informing the reception of data transmitted from a base station according to a DRX/DTX cycle.

To make terminals perform the DRX/DTX operation for low power consumption in the active state, the base station 7 variably allocates a DRX/DTX cycle to terminals that do not transmit/receive data to/from the base station for a predetermined time according to the provided service among the terminals receiving a service. When downlink data are generated, a signaling message for informing the generation of the downlink data is transmitted according to the DRX/DTX cycle of the terminal.

Among the active-state terminals, those that have not transmitted/received data to/from the base station for more than a predetermined time performs DRX/DTX operation for low power consumption according to the DRX/DTX cycle allocated under the control of the base station. Terminals that perform DRX/DTX operation in the active state monitor a signaling message that informs the reception of downlink data for each DRX/DTX period and, when data to be transmitted through an uplink are generated, transmit a signaling message informing the generation of the data to thereby resume to receive the service.

Figure 3:
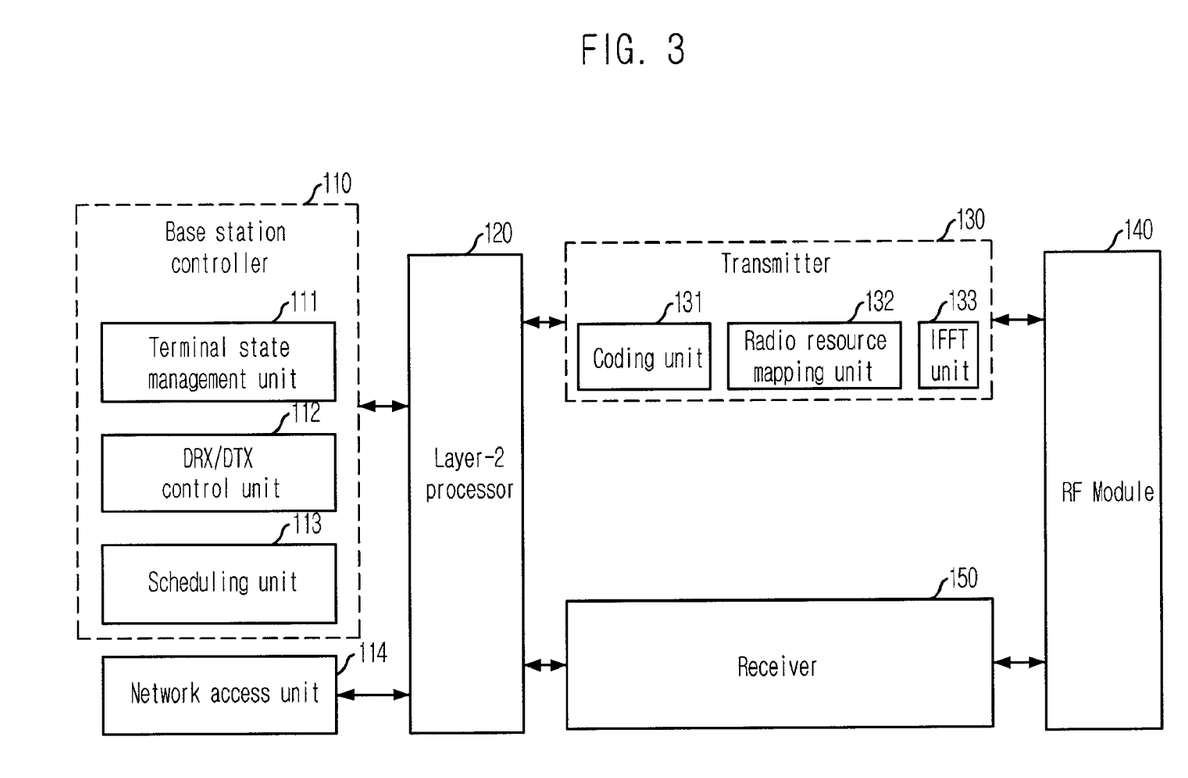
FIG. 3 is a block view showing a base station performing discontinuous reception/transmission for low power consumption in accordance with an embodiment of the present invention.

FIG. 3 is a block view showing a base station performing discontinuous reception/transmission for low power consumption in accordance with an embodiment of the present invention.

Referring to FIG. 3, a base station includes a base station controller 110, a layer-2 processor 120, a transmitter 130, a radio frequency (RF) module 140, and a receiver 150.

The base station controller 110 includes a terminal state management unit 111, a DRX/DTX control unit 112, a scheduling unit 113, and a network access unit 114.

The terminal state management unit 111 and the DRX/DTX control unit 112 are constituent elements for controlling DRX/DTX operation of an active-state terminal for low power consumption.

The terminal state management unit 111 manages the terminal according to whether the terminal is in the idle state or the active state and controls state shift.

The scheduling unit 113 provides information on the terminals that have not transmitted/received data for more than a predetermined time to the terminal state management unit 111 and the DRX/DTX control unit 112 among the active-state terminals and determines whether to perform the DRX/DTX operation for low power-consumption.

The DRX/DTX control unit 112 receives information on the state of the terminals and information on where the terminals have transmitted/received data from the scheduling unit 113 and the terminal state management unit 111, determines whether to make the active-state terminals perform the DRX/DTX operation for low power-consumption, variably determines DRX/DTX parameters according to the quality of service of the provided packet service or the capability of each terminal, and outputs them to the layer-2 processor 120.

The layer-2 processor 120 generates a control message including the DRX/DTX parameters and outputs it to the transmitter 130.

The transmitter 130 receives the control message, codes the control message in a coding unit 131, performs radio resource mapping in a radio resource mapping unit 132, performs inverse Fast Fourier Transform (IFFT) in an IFFT unit 133, and transmits the result to the terminals through the RF module 140.

Figure 4:
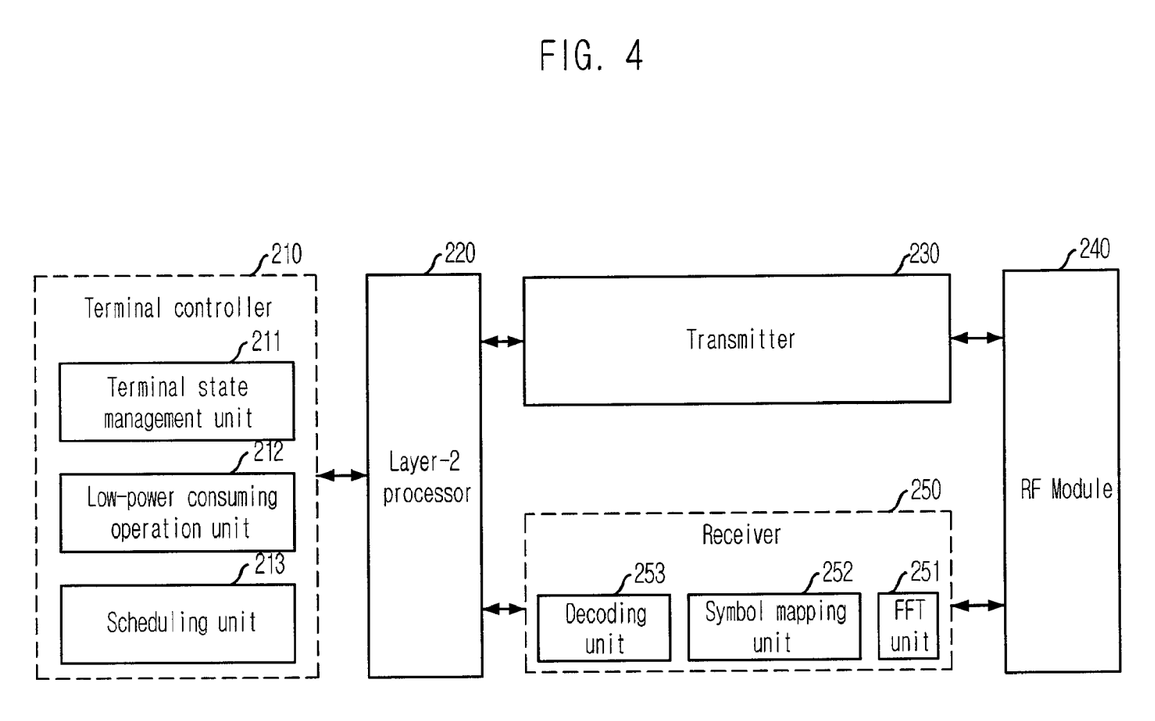
FIG. 4 is a block view showing a terminal performing discontinuous reception/transmission for low power consumption in accordance with an embodiment of the present invention.

FIG. 4 is a block view showing a terminal performing discontinuous reception/transmission for low power consumption in accordance with an embodiment of the present invention.

Referring to FIG. 4, a terminal includes a terminal controller 210, a layer-2 processor 220, a transmitter 230, an RF module 240, and a receiver 250.

The RF module 240 receives signals from a base station to which the terminal belongs, i.e., where the terminal camps in, and outputs the signals to the receiver 250.

A terminal performing the DRX/DTX operation for low power consumption under the control of the base station operates the receiver 250 at every DRX/DTX cycle, extracts symbols by performing FFT process onto the signals of the base station inputted from the RF module 240, performs symbol mapping onto the received signals based on base station modulation information included in the control information in the symbol mapping unit 252, and outputs the result to the decoding unit 54.

The decoding unit 253 decodes the symbols transmitted from the symbol mapping based on base station information included in the control information and outputs extracted packet information to the layer-2 processor 220.

The layer-2 processor 220 outputs information received at the DRX/DTX cycle to the terminal state management unit 211 and the low-power consuming operation unit 212 of the terminal controller 210.

The terminal state management unit 211 and the low-power consuming operation unit 212 determine to perform low-power consuming operation and maintain the current state, when there is no downlink signal reception information within the inputted packet information. When there is downlink signal reception information, the low-power consuming operation unit 212 determines to suspend the low power consuming operation, and the terminal state management unit 211 controls the shifting from the transmission suspension mode into a transmission mode.

With no regard to the control of the base station on the reception of the downlink information, when data to be transmitted in the uplink are generated, the terminal controller 210 controls the terminal state management unit 211 and the low power consuming operation unit 212 to suspend the low-power consuming operation, determines to initiate the uplink transmission in the scheduling unit 213 regardless of the DRX/DTX cycle, generates a control message in the layer-2 processor 220, and transmits uplink packet information to the base station through the transmitter 230 and the RF module 240.

Figure 5:
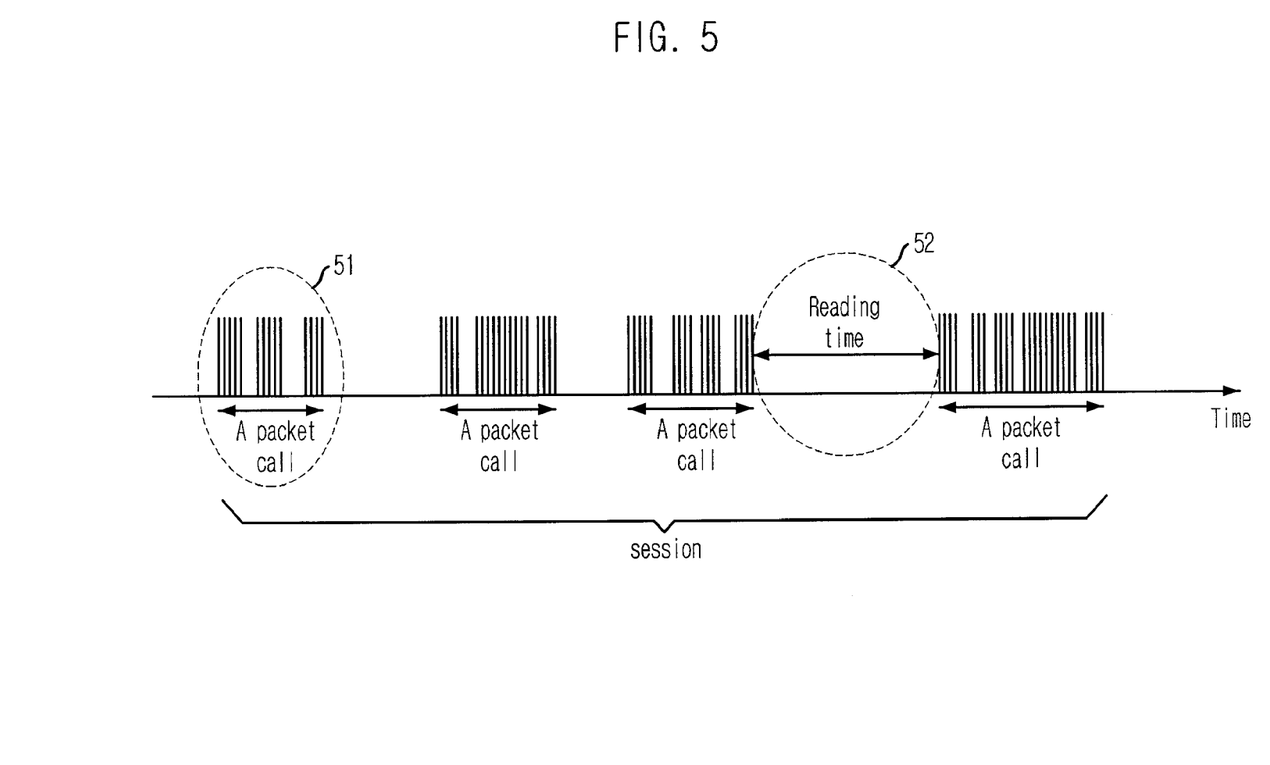
FIG. 5 is a view showing the form of packet data which is applied to the present invention.

FIG. 5 is a view showing the form of packet data which is applied to the present invention.

Referring to FIG. 5, an active-state terminal defines a transmission mode as a state that packet calls 51 burst out due to the characteristics of packet data and occupies radio resources allocated by a scheduling unit to transmit the packet data. When there is no packet data to be transmitted, such as a reading time 52, the terminal defines the state as a transmission suspension mode where the base station performs low power consuming operation.

Also, when the base station and the terminal recognize terminal of all sessions on service or if needed, they can shift the terminal into an idle state.

For the state shift and mode switching, they can set up DRX/DTX parameters according to the type or QoS of a packet service, and include the DRX/DTX parameters in system information transmitted through a broadcasting channel.

The DRX/DTX parameters include a DRX/DTX cycle initial value, a minimum DRX/DTX cycle, a DRX/DTX cycle augmentative coefficient, a duration applying a same DRX/DTX cycle, a transmission mode residue threshold value, and a transmission suspension mode residue threshold value.

The DRX/DTX cycle initial value is a DRX/DTX cycle value applied to the initial period of the transmission suspension mode.

The minimum DRX/DTX cycle is the minimum value of a coefficient for setting up a DRX/DTX cycle that is applied to the radio resource allocation for transmitting control information of a terminal that the scheduling unit of a base station has switched into a transmission suspension mode.

The DRX/DTX cycle augmentative coefficient is a coefficient value for indicating an increased amount when the DRX/DTX cycle of terminals which are switched into the transmission suspension mode and perform the DRX/DTX operation.

The duration applying a same DRX/DTX cycle is a value of a counter or a value set up as time to increase a DRX/DTX cycle after maintaining it uniformly as long as a duration applying a same DRX/DTX cycle, when the DRX/DTX cycle is increased as much as the DRX/DTX cycle augmentation coefficient during the operation of transmission suspension mode.

The transmission mode residue threshold value is a threshold value that the terminal can remain in the transmission mode without packet data to be transmitted in the transmission buffers of the base station and the terminal.

The transmission suspension mode residue threshold value is a threshold value that a terminal can operate in the transmission suspension mode when the terminal does not or cannot recognize the termination of a provided packet service.

When there are packet data in the transmission buffers of the base station and the terminal, the terminal operates in the transmission mode, which is a sub-state of the active state, and the scheduling unit occupies allocated radio resources and transmits data. The scheduling unit can switch the terminal from the transmission mode into the transmission suspension mode in the following situations:

when packet data are not generated until the base station and the terminal set up a buffer timer at a buffer empty moment that all data to be transmitted are transmitted and the transmission buffers of the base station and the terminal become empty and begin counting, and the timer value exceeds the transmission mode residue threshold value.

when it is impossible to allocate radio resources due to a poor radio communication environment between a node B and the terminal.

when the scheduling unit determines to switch the terminal mode into the transmission suspension mode for other reasons.

The base station can efficiently use limited radio resources for transmitting control information that should be allocated to the active-state terminals by switching some terminals into the transmission suspension mode in the above occasions.

Also, when there is no data to be transmitted that burst out, the terminals operate in the transmission suspension mode perform discontinuous transmission (DTX) to reduce their power consumption by using the uplink radio resources for transmitting control information, which are allocated according to the DRX/DTX cycle and reporting the terminal buffer state and reporting the quality of an estimated downlink channel.

Furthermore, the process time taken for switching between the transmission mode and the transmission suspension mode can be minimized by properly establishing and operating the DRX/DTX cycle between the base station and the terminal, and using an indicator for informing the presence of downlink traffic at every DRX/DTX cycle and radio resources allocated to the uplink to request to switch the mode.

When the base station is switched between the transmission mode and the transmission suspension mode, it discusses and determines DRX/DTX parameters for each terminal according to the terminal and the QoS of the provided packet service, and informs them to the terminal through a control channel. In the meantime, when there is no discussing process between the base station and the terminals, the terminals performs DRX/DTX operation according to the DRX/DTX parameters transmitted through a broadcasting channel.

The DRX/DTX cycle is determined according to the DRX/DTX parameters, which are determined between the base station and the terminals, based on the following algorithm:

when n>0 and n mod duration applying a same DRX/DTX cycle is equal to 0,

DRX/DTX cycle (n+1)=DRX/DTX cycle (n)*DRX/DTX cycle augmentation coefficient.

In other cases,

DRX/DTX cycle (n+1)=DRX/DTX cycle (n)

where n=0, 1, 2, 3 . . . , i

DRX/DTX cycle (0)=DRX/DTX cycle initial value

Figure 6:
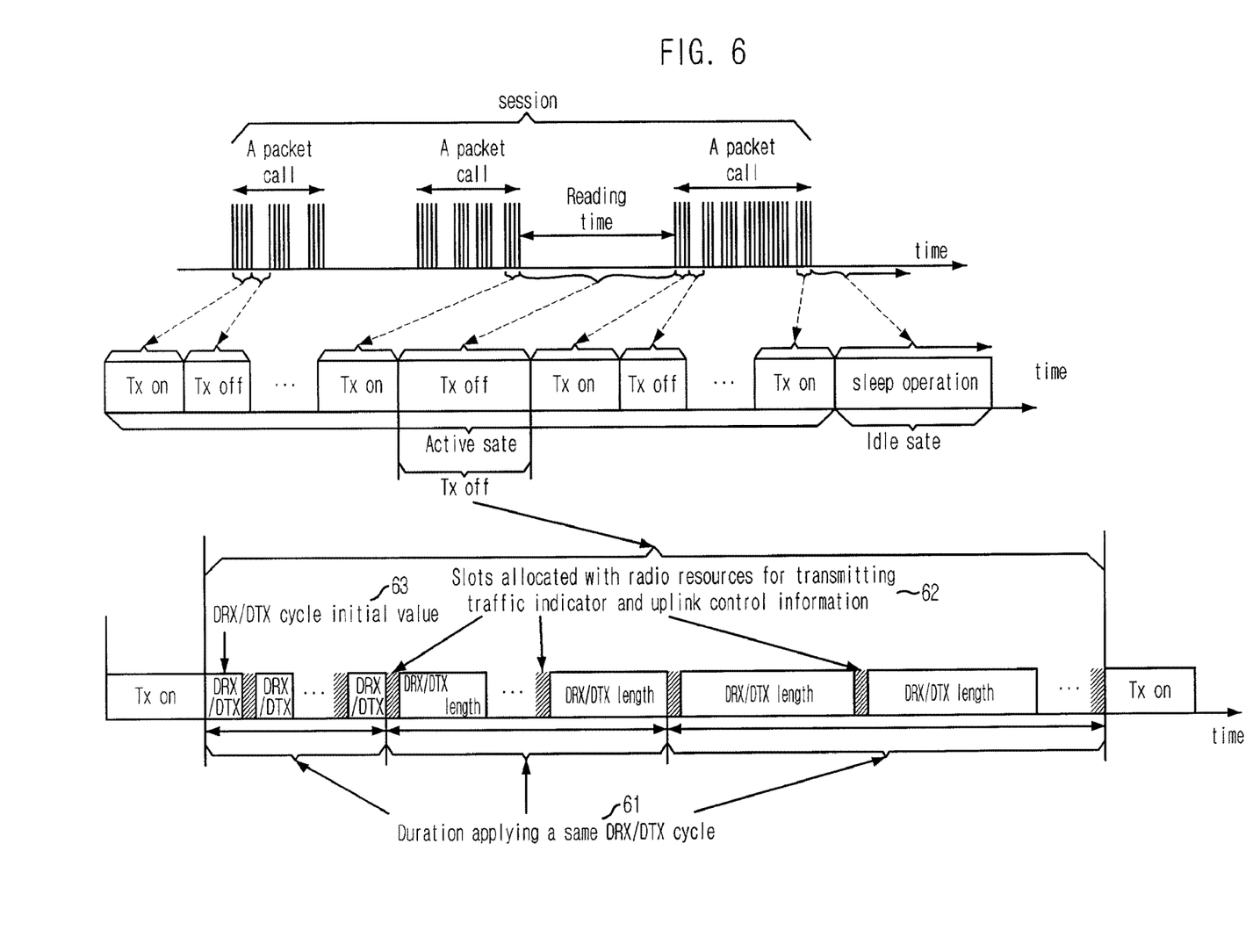
FIG. 6 is an exemplary view showing a DRX/DTX cycle allocated in accordance with an embodiment of the present invention.

DRX/DTX cycle augmentation coefficient=1, 2, 3 . . . , j duration applying a same DRX/DTX cycle=time duration (or a threshold value of a counter) to which the same DRX/DTX cycle is applied FIG. 6 is an exemplary view showing a DRX/DTX cycle allocated in accordance with an embodiment of the present invention.

When the DRX/DTX cycle initial value 63, DRX/DTX cycle augmentation coefficient and duration applying a same DRX/DTX cycle 61 of an active-state terminal operating in the transmission suspension mode (Tx off) are respectively 50 milliseconds, 2 and 500 milliseconds (or the counter threshold value is determined at 10), an identical DRX/DTX cycle is applied in the DRX/DTX cycle sustaining section 61, and another DRX/DTX cycle which is increased by the previous DRX/DTX cycle based on the DRX/DTX cycle augmentation coefficient is applied in the next duration applying a same DRX/DTX cycle 61 according to the algorithm of FIG. 6. In other words, a DRX/DTX cycle initial value of 50 milliseconds is applied in the initial duration applying a same DRX/DTX cycle, and 100 milliseconds, which is twice as much as the DRX/DTX cycle initial value, is applied in the next duration applying a same DRX/DTX cycle. Whenever one duration applying a same DRX/DTX cycle ends ((n mod duration applying a same DRX/DTX cycle)=0), the DRX/DTX cycle increases twice as much according to the DRX/DTX cycle augmentation coefficient.

To be specific, the terminal enters into the transmission suspension mode and performs low power-consuming operation to thereby consume the least amount of power needed by the receiver during the DRX/DTX cycle of 50 ms and suspend the operation of the transmitter and the most part of the receiver. At the end of the 50 ms-DRX/DTX cycle, the terminal monitors radio resources for transmitting a traffic indicator and uplink control information. In the monitoring duration, when the terminal finds out no data to be transmitted in the uplink or no information indicating downlink data reception, the terminal performs the low power-consuming operation according to the DRX/DTX cycle. In the example of parameters, the identical DRX/DTX cycle is applied during the duration applying a same DRX/DTX cycle, i.e., 500 ms, and after fall 10 monitoring durations occurs in one duration applying a same DRX/DTX cycle. When a counter is employed, the counter number increases by 1 whenever one DRX/DTX cycle passes. To sum up, in the above case, the counter number increases by 1 at every 50 ms and one DRX/DTX cycle is applied until the counter number becomes 10.

Therefore, the terminal determines based on the algorithm whether it is in or out of a duration applying a same DRX/DTX cycle, whenever one DRX/DTX cycle ends. When n>0, (n mod duration applying a same DRX/DTX cycle)=0. When the timer of the terminal or an independent DRX/DTX cycle counter indicates the end of a duration applying a same DRX/DTX cycle, the terminal performs calculation to obtain a DRX/DTX cycle to be applied in the next duration applying a same DRX/DTX cycle based on the above algorithm equation.

When the DRX/DTX cycle augmentation coefficient is determined to be 1 regardless of parameters of the duration applying a same DRX/DTX cycle, the DRX/DTX cycle of the terminal, which is in the transmission suspension mode, becomes the DRX/DTX cycle initial value 63 all through the transmission suspension mode.

The DRX/DTX parameters including the DRX/DTX cycle initial value 63 are variably determined according to the type of a packet service and the QoS.

For example, in case of a real-time voice of IP (VoIP) service, low power-consuming operation can be performed based on the DRX/DTX cycle initial value by setting up the DRX/DTX cycle initial value at 20 ms and the DRX/DTX cycle augmentation coefficient to be '1' regardless of the duration applying a same DRX/DTX cycle parameter, and limiting the variation of the DRX/DTX cycle. To sum up, in a real-time service, overhead caused by transmitting control information can be reduced by fixing the DRX/DTX cycle and allocating radio resources periodically based on the DRX/DTX cycle without transmitting an additional control message for the allocation of radio resources, e.g., L1/L2 control signaling, and the QoS of a service required by the system can be achieved while reducing the power consumption of the terminal. Herein, the DRX/DTX cycle initial value for each terminal may be set up differently according to the type of the real-time service and the capacity of the terminal.

Meanwhile, a short DRX/DTX cycle initial value may be determined in a non-real time http service for the Internet Access to reduce delay time until data are retransmitted to the low power-consuming terminals. Generally, however, the DRX/DTX cycle initial value may be determined relatively larger than that of a real-time service. The throughput of a system can be improved by determining the duration applying a same DRX/DTX cycle to be a multiple of a Transmission Time Interval (TTI) based on the statistical characteristic of a packet service in consideration of the load on a base station, determining the DRX/DTX cycle augmentation coefficient to be 2 or higher, and varying the DRX/DTX cycle. In short, a non-real time service is not sensitive to delay of packet data and its activity is not predicted. Therefore, it is desirable to determine the DRX/DTX cycle initial value of a non-real time service larger than that of a real-time service according to the load on a base station, type of non-real time service, and capacity of a terminal, and varying the DRX/DTX cycle based on the parameters of the duration applying a same DRX/DTX cycle and the parameters of the DRX/DTX cycle augmentation coefficient. The method has a shortcoming that the base station and the terminal should exchange a control message for allocating radio resources to transmit packet data by varying the DRX/DTX cycle. However, it can efficiently reduce the power consumption of the terminal.

A base station allocates a traffic indicator for informing that there are packet data to be transmitted from the base station to each of the terminals operating in the transmission suspension mode, and radio resources 62 for transmitting control information in the uplink for each DRX/DTX cycle.

When a terminal operating in the transmission suspension mode receives an indicator informing that there are packet data to be received from the base station in the downlink, it transmits control information for switching the mode through the uplink radio resources 62 allocated by the base station and is switched into the transmission mode.

Also, the terminal operating in the transmission suspension mode transmits the control information such as the state of a terminal buffer and downlink channel quality by using the uplink radio resources 62 allocated for each DRX/DTX cycle and, when there are data to be transmitted, it transmits the control information including a mode switching request into the transmission mode by using the allocated uplink radio resources 62.

Figure 7:
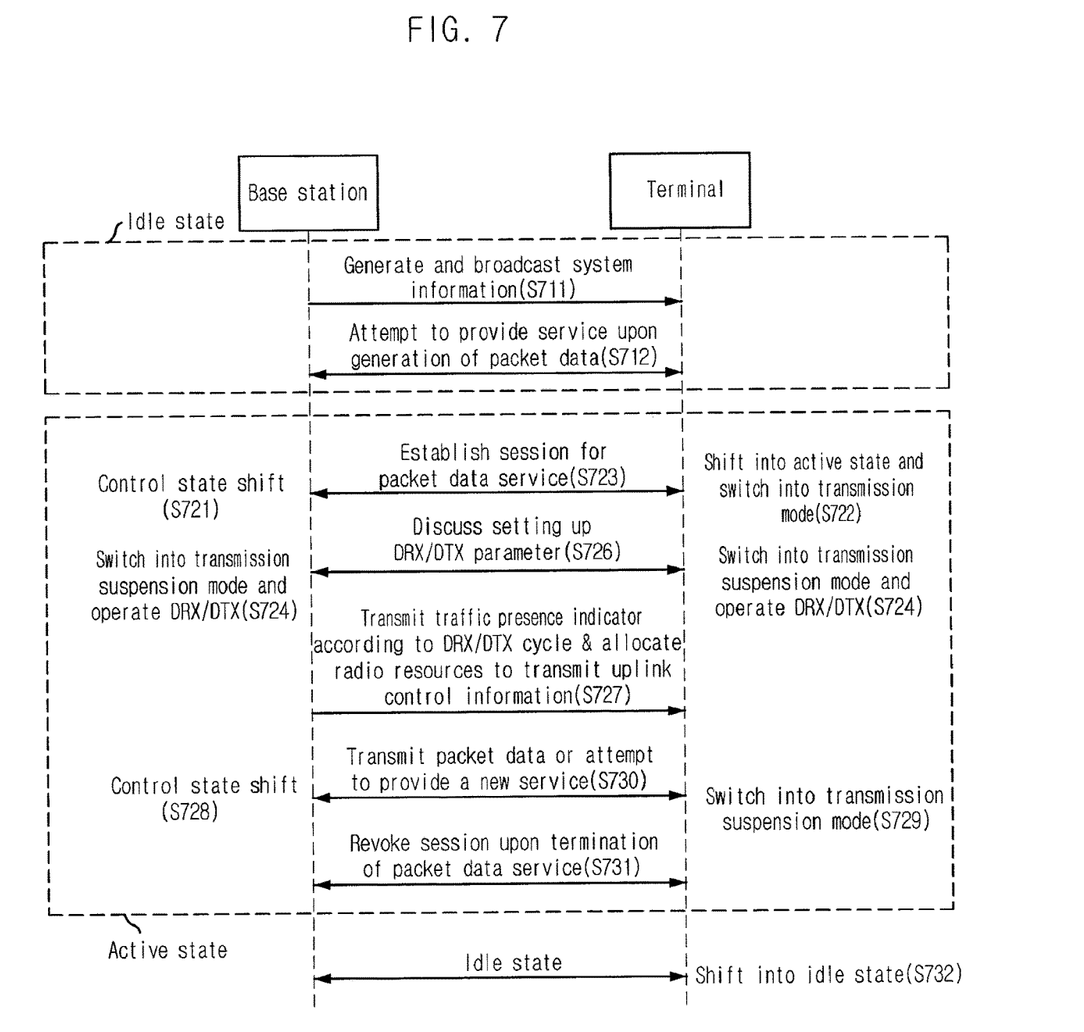
FIG. 7 is a signaling flowchart between a base station and a terminal that perform discontinuous operation for low power consumption in accordance with an embodiment of the present invention.

FIG. 7 is a signaling flowchart between a base station and a terminal that perform discontinuous operation for low power consumption in accordance with an embodiment of the present invention.

The base station determines DRX/DTX parameters based on the type and QoS of the packet service to shift the state and switch the mode of the idle terminal, generates system information including the DRX/DTX parameters, and transmits it through a broadcasting channel at step S711.

At step S712, when packet data are generated, the base station attempts to provide a service corresponding to the packet data. Herein, the base station attempts to provide a service through paging, and the terminal receives system information during a paging monitoring section and attempts to access in a random access method to provide the service corresponding to the generated packet data.

At step S721, the terminal is shifted into the active state by controlling the state shift, and the terminal whose mode is shifted into the active state operates in the transmission mode at step S722, and the base station and terminal establishes session for the packet data service at step S723.

Subsequently, when the transmission buffers of the base station and the terminal remain empty in the transmission mode and there is no attempt for a new service (buffer information timer>transmission mode residue threshold value), the terminal switches its mode into the transmission suspension mode and performs DRX/DTX at steps S724 and S725. The base station and terminal discus and set up the DRX/DTX parameters at step S726, and the base station transmits traffic presence indicator according to the DRX/DTX cycle and allocates radio resources for transmitting uplink control information at step S727.

Subsequently, when the terminal detects a downlink traffic indicator during the DRX/DTX operation in the transmission suspension mode or there are data to be transmitted, the terminal is switched into the transmission mode upon the state shift control (at step S728) of the base station at step S729, and attempts to transmit the packet data or attempts to provide a new service at step S730, and cancels the session at step S731 when the packet data service ends. At the step S730, the base station attempts to provide the service based on MAC paging, and when there is no uplink synchronization, the terminal attempts to provide the service through random access. When the uplink synchronization is achieved, the terminal attempts to provide the service by using the available radio resources for transmitting the control information. The MAC paging is a method that an MAC takes the initiative and informs the terminal of the generation of data to be transmitted through downlink, instead of the Radio Resource Control (RRC). It is different from RRC-controlled paging. An example of the MAC paging is to inform transmission of scheduling information.

Meanwhile, when the terminal is in the transmission suspension mode and the transmission suspension mode residue timer is larger than the transmission suspension mode residue threshold value or a session termination signal is generated, it shifts into the idle state at step S732.

Also, when the terminal is in the transmission mode and the transmission mode residue timer is larger than the transmission mode residue threshold value or a session termination signal is generated, it shifts into the idle state at the step S732, too.

The method of the present invention can be realized as a program and stored in a computer-readable recording medium such as CD-ROM, RAM, ROM, floppy disks, hard disks, and magneto-optical disks. Since the process can be easily implemented by those skilled in the art to which the present invention pertains, detailed description on it will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention is applied to a cellular system.

What is claimed is:

1. A communication method for transmitting data to a terminal by a communication apparatus, comprising:
   transmitting a first message, the first message comprising information on a first duration of time and a first period of time;
   transmitting a data packet to the terminal;
   determining that the first period of time has lapsed after transmitting the data packet without receiving any data packet from the terminal and transmitting any data packet to the terminal; and
   repeating a first operation after determining that the first period of time has lapsed without receiving any data packet from the terminal and transmitting any data packet to the terminal,
   wherein the first operation comprises:
      determining whether downlink data intended for reception by the terminal exists; and
      if the downlink data intended for reception by the terminal exists, transmitting the downlink data during a first part of the first duration of time or storing the downlink data during a second part of the first duration of time for later transmission to the terminal.

2. The method of claim 1, wherein the first message further comprises information on a second duration of time which is longer than the first duration of time, and the method further comprises:
   repeating a second operation after repeating the first operation,
   wherein the second operation comprises:
      determining whether downlink data intended for reception by the terminal exists; and
      if the downlink data intended for reception by the terminal exists, transmitting the downlink data during a first part of the second duration of time or storing the downlink data during a second part of the second duration of time for later transmission to the terminal.

3. The method of claim 2, further comprising:
   repeating a third operation after repeating the second operation,
   wherein the third operation comprises:
      determining whether an incoming call to the terminal exists; and
      if the incoming call to the terminal exists, transmitting the incoming call through a paging channel during a first part of a third duration of time or waiting during a second part of the third duration of time for later transmission of the incoming call to the terminal.

4. The method of claim 3, wherein the communication apparatus repeats the third operation when the terminal is in an idle state.

5. The method of claim 2, wherein a length of the first part of the first duration of time is equal to a length of the first part of the second duration of time.

6. The method of claim 1, wherein the communication apparatus repeats the first operation when the terminal is in an active state.

7. A communication apparatus, comprising:
   a processor; and
   a memory operably coupled to the processor,
   wherein the processor, when executing program instructions stored in the memory, is configured to:
      cause the communication apparatus to transmit a first message to a terminal, the first message comprising information on a first duration of time and a first period of time;
      cause the communication apparatus to transmit a data packet to the terminal;
      determine that the first period of time has lapsed after transmitting the data packet without receiving any data packet from the terminal and transmitting any data packet to the terminal; and
      repeat a first operation after determining that the first period of time has lapsed without receiving any data packet from the terminal and transmitting any data packet to the terminal,
   wherein the first operation comprises:
      determining whether downlink data intended for reception by the terminal exists; and
      if the downlink data intended for reception by the terminal exists, transmitting the downlink data during a first part of the first duration of time or storing the downlink data during a second part of the first duration of time for later transmission to the terminal.

8. The communication apparatus of claim 7, wherein the first message further comprises information on a second duration of time which is longer than the first duration of time, and the processor is further configured to:
   repeat a second operation after repeating the first operation,
   wherein the second operation comprises:
      determining whether downlink data intended for reception by the terminal exists; and
      if the downlink data intended for reception by the terminal exists, transmitting the downlink data during a first part of the second duration of time or storing the downlink data during a second part of the second duration of time for later transmission to the terminal.

9. The communication apparatus of claim 8, wherein the processor is further configured to:
repeat a third operation after repeating the second operation,
wherein the third operation comprises:
determining whether an incoming call to the terminal exists; and
if the incoming call to the terminal exists, transmitting the incoming call through a paging channel during a first part of a third duration of time or waiting during a second part of the third duration of time for later transmission of the incoming call to the terminal.

10. The communication apparatus of claim 9, wherein the processor is configured to repeat the third operation when the terminal is in an idle state.

11. The communication apparatus of claim 8, wherein a length of the first part of the first duration of time is equal to a length of the first part of the second duration of time.

12. The communication apparatus of claim 7, wherein the processor is configured to repeat the first operation when the terminal is in an active state.

13. A communication device for an e-Node B (eNB), the communication device comprising:
a processor; and
a memory operably coupled to the processor,
wherein the processor, when executing program instructions stored in the memory, is configured to:
cause the eNB to transmit a first message to a terminal, the first message comprising information on a first duration of time and a first period of time;
cause the eNB to transmit a data packet to the terminal;
determine that the first period of time has lapsed after transmitting the data packet without receiving any data packet from the terminal and transmitting any data packet to the terminal; and
repeat a first operation after determining that the first period of time has lapsed without receiving any data packet from the terminal and transmitting any data packet to the terminal,
wherein the first operation comprises:
determining whether downlink data intended for reception by the terminal exists; and
if the downlink data intended for reception by the terminal exists, transmitting the downlink data during a first part of the first duration of time or storing the downlink data during a second part of the first duration of time for later transmission to the terminal.

14. The communication device of claim 13, wherein the first message further comprises information on a second duration of time which is longer than the first duration of time, and the processor is further configured to:
repeat a second operation after repeating the first operation,
wherein the second operation comprises:
determining whether downlink data intended for reception by the terminal exists; and
if the downlink data intended for reception by the terminal exists, transmitting the downlink data during a first part of the second duration of time or storing the downlink data during a second part of the second duration of time for later transmission to the terminal.

15. The communication device of claim 14, wherein the processor is further configured to:
repeat a third operation after repeating the second operation,
wherein the third operation comprises:
determining whether an incoming call to the terminal exists; and
if the incoming call to the terminal exists, transmitting the incoming call through a paging channel during a first part of a third duration of time or waiting during a second part of the third duration of time for later transmission of the incoming call to the terminal.

16. The communication device of claim 15, wherein the processor is configured to repeat the third operation when the terminal is in an idle state.

17. The communication device of claim 14, wherein a length of the first part of the first duration of time is equal to a length of the first part of the second duration of time.

18. The communication device of claim 13, wherein the processor is configured to repeat the first operation when the terminal is in an active state.

* * * * *